United States Patent
Humphrey et al.

(10) Patent No.: US 9,868,430 B2
(45) Date of Patent: Jan. 16, 2018

(54) COMMUNICATION NETWORK HAVING LOCOMOTIVE EXPANSION MODULE

(71) Applicant: Progress Rail Services Corporation, Albertville, AL (US)

(72) Inventors: Stephen Harold Humphrey, Pleasant Hill, MO (US); Marc David Miller, Lee's Summit, MO (US); Todd Charles Goergen, Blue Springs, MO (US)

(73) Assignee: Progress Rail Services Corporation, Albertville, AL (US)

( * ) Notice: Subject to any disclaimer, the term of this patent is extended or adjusted under 35 U.S.C. 154(b) by 77 days.

(21) Appl. No.: 14/820,321

(22) Filed: Aug. 6, 2015

(65) Prior Publication Data

US 2017/0036660 A1 Feb. 9, 2017

(51) Int. Cl.
*B60T 17/22* (2006.01)
*B60T 8/17* (2006.01)
(Continued)

(52) U.S. Cl.
CPC ............ *B60T 17/228* (2013.01); *B60T 8/171* (2013.01); *B60T 8/1705* (2013.01); *B61L 15/0036* (2013.01); *B61L 15/0072* (2013.01); *B61L 15/0081* (2013.01); *B60T 13/665* (2013.01); *B60T 2270/413* (2013.01)

(58) Field of Classification Search
CPC ............. B61L 15/0036; B61L 15/0072; B61L 15/0081; B60T 17/228; B60T 8/1705; B60T 8/171; B60T 13/665; B60T 13/406; B60T 13/227; B60T 13/413
See application file for complete search history.

(56) References Cited

U.S. PATENT DOCUMENTS

| | | | | |
|---|---|---|---|---|
| 4,859,000 A | * | 8/1989 | Deno | B60T 17/228 303/20 |
| 5,185,700 A | * | 2/1993 | Bezos | B60L 3/12 340/870.41 |

(Continued)

FOREIGN PATENT DOCUMENTS

WO    WO 2014/137643    9/2014

OTHER PUBLICATIONS

Maxim Integrated DS2450 1-Wire Quad A/D Converter Brochure.*

*Primary Examiner* — Natalie Huls
(74) *Attorney, Agent, or Firm* — Finnegan, Henderson, Farabow, Garrett & Dunner, LLP

(57) ABSTRACT

An expansion module is disclosed for use in a communication network. The expansion module may include a housing, an input interface connected to the housing and configured to externally connect with at least one analog device, and an output interface connected to the housing and configured to externally connect with the communication network. The expansion module may also include at least one processor located in the housing and configured to receive analog signals from the input interface, to convert the analog signals to digital signals, and to direct the digital signals to the output interface. The expansion module may also include at least one sensor located in the housing and configured to generate digital signals indicative of a performance parameter associated with a fluid in communication with the housing.

14 Claims, 2 Drawing Sheets

(51) Int. Cl.
  *B60T 8/171*  (2006.01)
  *B61L 15/00*  (2006.01)
  *B60T 13/66*  (2006.01)

(56) References Cited

U.S. PATENT DOCUMENTS

| | | | |
|---|---|---|---|
| 5,651,517 A * | 7/1997 | Stevens | B61L 15/0036 246/122 R |
| 6,487,478 B1 * | 11/2002 | Azzaro | B60L 3/12 340/3.1 |
| 7,869,908 B2 | 1/2011 | Walker | |
| 8,126,679 B2 | 2/2012 | Jammu et al. | |
| 8,260,487 B2 | 9/2012 | Plawecki | |
| 9,296,401 B1 * | 3/2016 | Palmer | B61L 15/0072 |
| 2004/0104310 A1 * | 6/2004 | Demuth | B61L 15/0081 246/122 R |
| 2006/0290199 A1 * | 12/2006 | Beck | B60T 13/665 303/7 |
| 2010/0256843 A1 * | 10/2010 | Bergstein | B60T 17/228 701/19 |
| 2012/0166109 A1 * | 6/2012 | Kernwein | B60T 13/665 702/47 |
| 2013/0168503 A1 * | 7/2013 | Cooper | B61L 15/0027 246/167 R |
| 2013/0304896 A1 * | 11/2013 | Collins | B61L 15/0081 709/224 |
| 2013/0320154 A1 * | 12/2013 | Brown | B61G 5/06 246/169 A |
| 2014/0116283 A1 * | 5/2014 | Steffen | B61O 5/00 105/1.4 |
| 2014/0129109 A1 * | 5/2014 | Meyer | B61L 15/0027 701/82 |
| 2014/0163769 A1 * | 6/2014 | Otsubo | H04L 12/413 701/1 |
| 2014/0209756 A1 * | 7/2014 | Brown | B61L 15/0054 246/169 R |
| 2015/0367862 A1 * | 12/2015 | Ledbetter | B61O 5/00 701/19 |
| 2016/0075346 A1 * | 3/2016 | Wright | B61C 17/12 701/19 |
| 2016/0159379 A1 * | 6/2016 | Raeder | B60K 35/00 701/19 |
| 2016/0176419 A1 * | 6/2016 | Tsuzaka | B60L 3/0076 701/20 |
| 2016/0185326 A1 * | 6/2016 | Brooks | B60T 8/171 701/19 |
| 2016/0359741 A1 * | 12/2016 | Cooper | B61C 17/12 |

* cited by examiner

COMMUNICATION NETWORK HAVING LOCOMOTIVE EXPANSION MODULE

TECHNICAL FIELD

The present disclosure relates generally to a communication network and, more particularly, to a communication network having a locomotive expansion module.

BACKGROUND

A consist includes one or more locomotives that are coupled together to produce motive power for a train of rail vehicles. The locomotives each include one or more engines, which combust fuel to produce mechanical power. The engine(s) of each locomotive can be supplied with liquid fuel (e.g., diesel fuel) from an onboard tank, gaseous fuel (e.g., natural gas) from a tender car, or a blend of the liquid and gaseous fuels. The mechanical power produced by the combustion process is directed through a generator and used to generate electricity. The electricity is then routed to traction motors of the locomotives, thereby generating torque that propels the train. The locomotives can be connected together at the front of the train, or separated and located at different positions along the train. For example, the consist can be positioned at the front, middle, or end of the train. In some instances, more than one consist can be included within a single train. In some consists, the locomotives include computer systems for coordinating operations of the locomotives.

Because the locomotives of a consist must cooperate to propel the train, communication between the locomotives can be important. Historically, this communication has been facilitated through the use of an MU (Multi-Unit) cable that extends along the length of the consist. An MU cable is comprised of many different wires, each capable of carrying a discrete signal used to regulate a different aspect of consist operation. For example, a lead locomotive generates current within a particular one of the wires to indicate a power level setting requested by the train operator. When this wire is energized, the engines of all trailing locomotives are caused to operate at a specific throttle level. In another example, when one locomotive experiences a fault condition, another of the wires is energized to alert the other locomotives of the condition's existence.

In some consists, the locomotives communicate via the computer systems on an Ethernet network formed over the MU cables or over other intra-consist electrical cables. With this configuration, network data can be transmitted from the computer system in the lead locomotive to the computer systems in the trail locomotives, and vice-versa. The network data includes data that is packaged as data packets and uniquely addressed to particular computer systems or particular components connected with the computer systems. The network data can be, for example, vehicle sensor data indicative of vehicle health, commodity condition data, temperature data, weight data, and security data. The network data is transmitted orthogonal to conventional non-network (i.e., command) data that is already being transmitted on the MU cable.

Although functional with newer locomotives having digital components, the computer systems may not function well with older locomotives. In particular, some or all of the signals generated by existing sensors and components of the older locomotives may be analog signals, and the computer systems may be capable of receiving, interpreting, recording, and/or transmitting only digital signals. In addition, some existing systems and/or components of older locomotives may not be monitored at all and, accordingly, may be incompatible with modern computer systems.

One attempt to improve communication within a train is described in U.S. Pat. No. 7,869,908 of Walker that issued on Jan. 11, 2011 ("the '908 patent"). Specifically, the '908 patent describes a computer-implemented system for a locomotive. The system includes a digital microprocessor having an expansion area with an analog-to-digital (A/D) converter, The A/D converter receives and stores discrete electronic signals from analog sources on the locomotive, such as from an onboard sensor monitoring an air manifold pressure. This allows the microprocessor to determine a state or condition of the analog sources. Data received via the expansion area is logged into a database and used for troubleshooting or analysis.

While the system disclosed in the '908 patent may avoid some of the disadvantages of an all-digital network, it may still be problematic. In particular, the system may still not account for older locomotives having unmonitored systems or components.

The disclosed communication network and expansion module are directed to overcoming one or more of the problems set forth above.

SUMMARY

In one aspect, the present disclosure is directed to an expansion module for a communication network. The expansion module may include a housing, an input interface connected to the housing and configured to externally connect with at least one analog device, and an output interface connected to the housing and configured to externally connect with the communication network. The expansion module may also include at least one processor located in the housing and configured to receive analog signals from the input interface, to convert the analog signals to digital signals, and to direct the digital signals to the output interface. The expansion module may also include at least one sensor located in the housing and configured to generate digital signals indicative of a performance parameter associated with a fluid in communication with the housing.

In another aspect, the present disclosure is directed to a communication network for a consist having a first vehicle connected to a second vehicle by way of a fluid coupling. The communication network may include a first network component, an analog device configured to generate analog signals indicative of a performance parameter of the first network component, and a second network component. The communication network may further include an expansion module having a housing, an input interface connected to the housing and externally connected with the analog device, and an output interface connected to the housing and externally connected with the second network component. The expansion module may further have at least one processor located in the housing and configured to receive the analog signals from the input interface, to convert the analog signals to digital signals, and to direct the digital signals to the output interface. The expansion module may additionally have at least one sensor located in the housing and configured to generate digital signals indicative of a performance parameter associated with a fluid in the fluid coupling.

In yet another aspect, the present disclosure is directed to a train consist. The train consist may include a first locomotive, a second locomotive, a first access point located on the first locomotive and being configured to control operations of the first locomotive, and a second access point located on one of the second locomotive and being configured to control operations of the second locomotive. The train consist may also include a cable connecting the first and second access points to communicate signals associated with coordinated control over operations of the first locomotive and the second locomotive, and a fluid coupling connecting the first locomotive to the second locomotive. The train consist may further include a first network component located on One of the first and second locomotives, an analog device configured to generate analog signals indicative of a performance parameter of the first network component, and an event recorder. The train consist may additionally include an expansion module having a housing, an input interface connected to the housing and externally connected with the analog device, and an output interface connected to the housing and externally connected with the event recorder. The expansion module may also have a processor located in the housing and configured to receive the analog signals from the input interface, to convert the analog signals to digital signals, and to direct the digital signals to the output interface. The expansion module may further have a pressure sensor located in the housing and configured to generate digital signals indicative of a pressure of a fluid in the fluid coupling.

DETAILED DESCRIPTION

Figure 1:
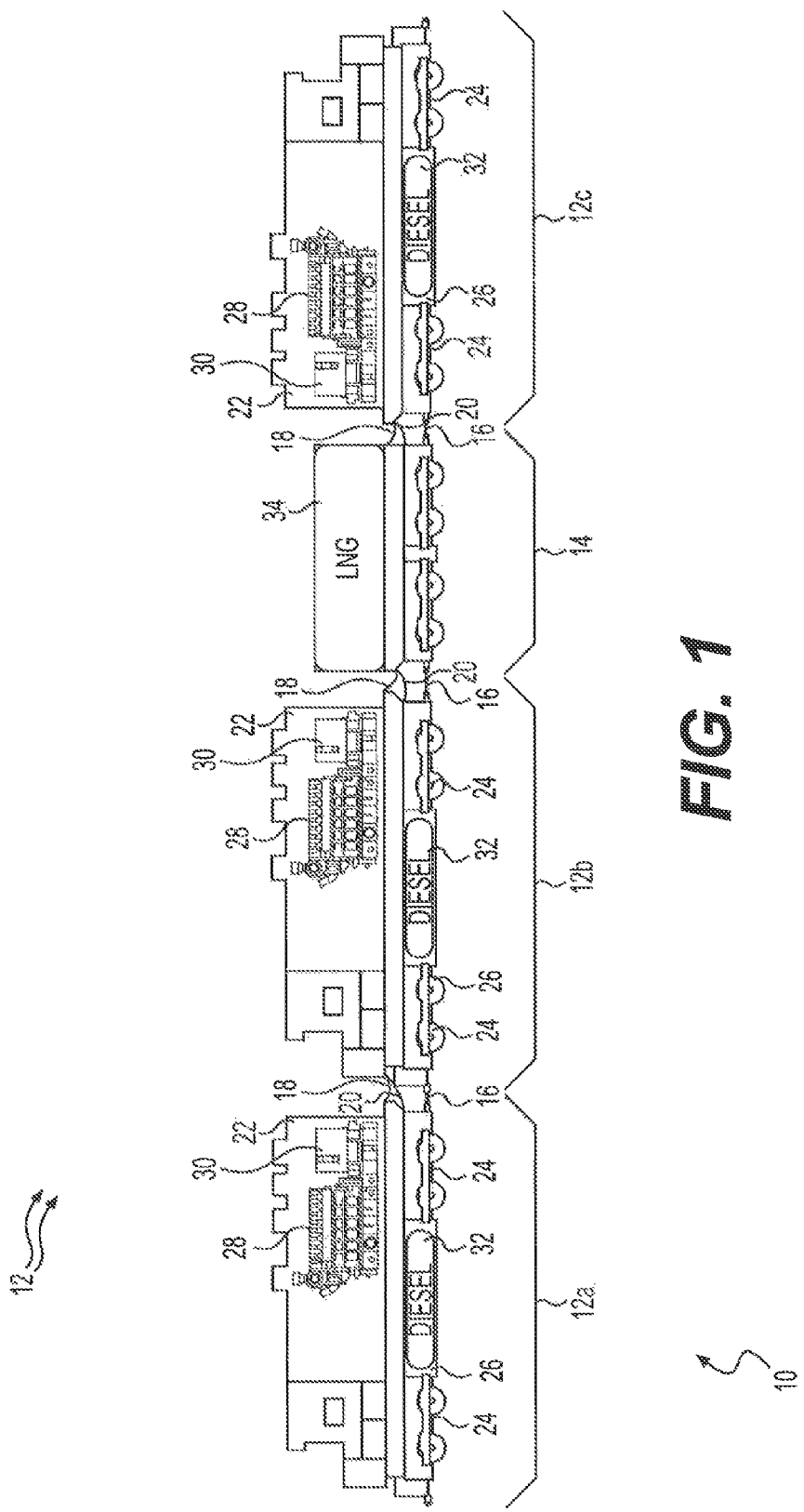
FIG. 1 is a pictorial illustration of an exemplary disclosed consist.

FIG. 1 illustrates an exemplary train consist 10 having one or more locomotives 12 and a tender car 14. In the disclosed embodiment, consist 10 has three different locomotives 12, including a lead locomotive 12a located ahead of tender car 14 and two trailing locomotives 12b, 12c located behind tender car 14. It is contemplated, however, that consist 10 may include any number of locomotives 12 and/or tender cars 14, and that locomotives 12 may be disposed in any arrangement relative to tender car(s) 14 and in any orientation (e.g., forward-facing or rear-facing). Consist 10 may be located at the front of a train of other rail vehicles (not shown), within the train of rail vehicles, or at the end of the train of rail vehicles. It is contemplated that more than one consist 10 may be included within a single train of rail vehicles, if desired, and/or that consist 10 may travel at times without a train of other rail vehicles. It is further contemplated that consist 10 may not include tender car 14, in some embodiments.

Each locomotive 12 may be connected to an adjacent locomotive 12 and/or to tender car 14 in several different ways. For example, locomotives 12 and tender car 14 may be connected to each other via a mechanical coupling 16, one or more fluid couplings 18, and one or more electrical couplings 20. Mechanical coupling 16 may be configured to transmit tractive and braking forces between locomotives 12 and tender car 14. Fluid couplings 18 may be configured to transmit fluids (e.g., fuel, coolant, lubricant, pressurized air, etc.) between locomotives 12 and tender car 14. Electrical couplings 20 may be configured to transmit power and/or data (e.g., data in the form of electrical signals) between locomotives 12 and tender car 14. In one example, electrical couplings 20 include an MU cable configured to transmit conventional command signals and/or electrical power. In another example, electrical couplings 20 include a dedicated data link configured to transmit packets of data (e.g., Ethernet data). In yet another example, the data packets may be transmitted via the MU cable. It is also contemplated that some data may be transmitted between locomotives 12 and tender car 14 via a combination of the MU cable, the dedicated data link, and/or other means (e.g., wirelessly), if desired.

Each locomotive 12 may include a car body 22 supported at opposing ends by a plurality of trucks 24 (e.g., two trucks 24). Each truck 24 may be configured to engage a track (not shown) via a plurality of wheels, and to support a frame 26 of car body 22. Any number of engines 28 may be mounted to frame 26 within car body 22 and drivingly connected to a generator 30 to produce electricity that propels the wheels of each truck 24. Engines 28 may be internal combustion engines configured to combust a mixture of air and fuel. The fuel may include a liquid fuel (e.g., diesel) provided to engines 28 from a tank 32. located onboard each locomotive 12, a gaseous fuel (e.g., natural gas) provided by tender car 14 via fluid couplings 18, and/or a blended mixture of the liquid and gaseous fuels.

Tender car 14, like locomotives 12, may also be equipped with a frame 26 that is supported by two or more trucks 24. Tender car 14 may include one or more tanks 34 mounted to its frame 26 that are configured to store liquefied gaseous fuel (e.g., liquefied natural gas or LNG). The liquefied gaseous fuel may be gasified and then fed in series or parallel to all locomotives 12 of consist 10 for combustion within engines 28. In the disclosed embodiment, a single insulated tank 34 is used to store the liquefied gaseous fuel at low temperatures, such as below about −160° C. In some embodiments, tank 34 may be integral with frame 26 of tender car 14.

Additional fuel delivery components (not shown) may be associated with tender car 14 and used to gasify and/or transport the fuel from tender car 14 to locomotives 12. These components may include, among other things, one or more fuel pumps, one or more heat exchangers, one or more accumulators, one or more regulators, and associated conduits that condition, pressurize or otherwise move fuel, as is known in the art. The pump(s) may pressurize the liquefied gaseous fuel to a desired operating pressure and push the fuel through the heat exchanger(s) to the accumulator(s). The heat exchanger(s) may provide heat sufficient to gasify the fuel as it moves therethrough. Upon vaporization, the fuel may be transported to and stored within the accumulator(s). Gaseous fuel may then be directed from the accumulator(s) to engines 28 via the regulator(s).

Figure 2:
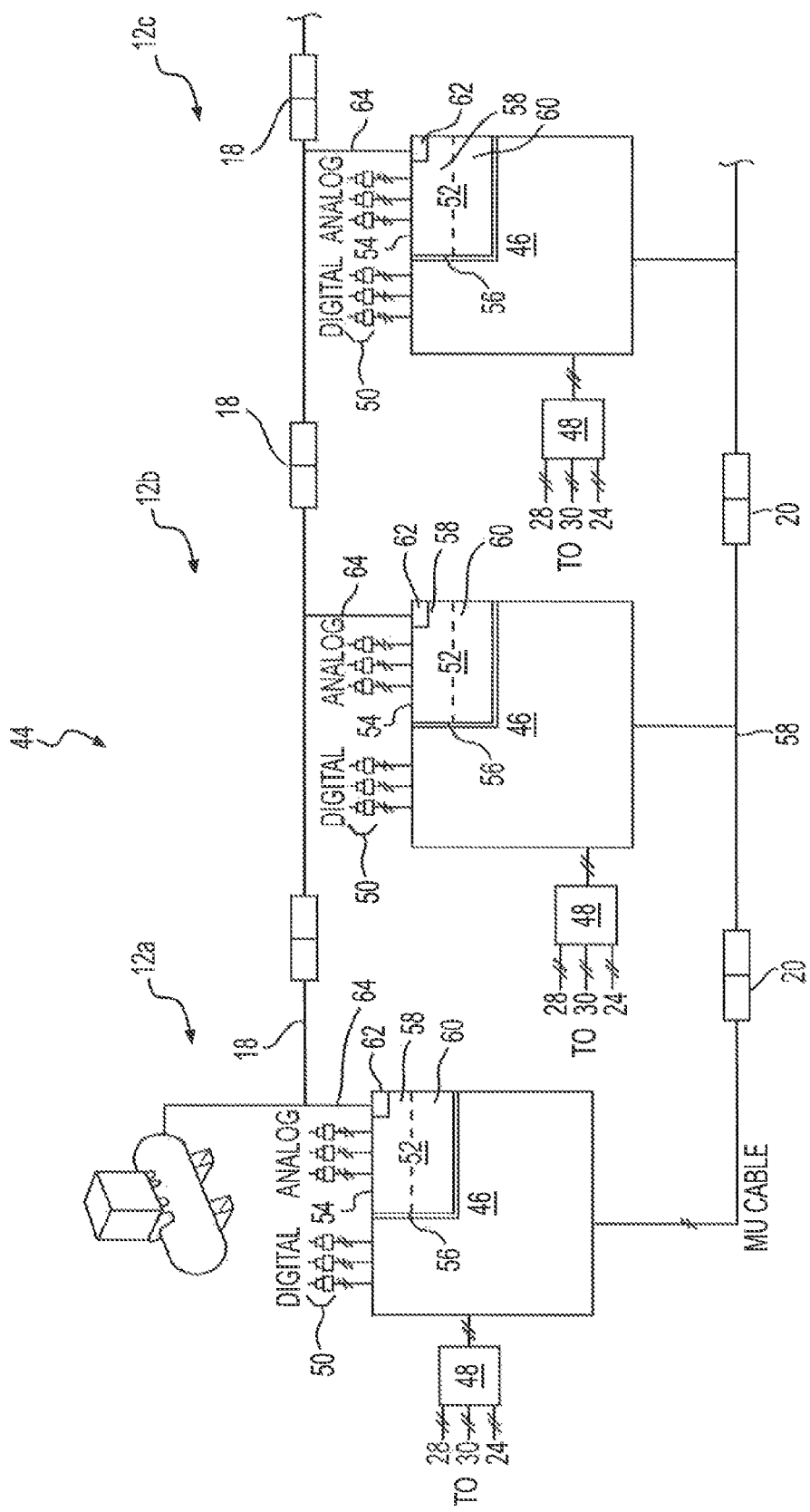
FIG. 2 is a diagrammatic illustration of an exemplary disclosed communication network that may be used in conjunction with the consist of FIG. 1.

As shown in FIG. 2, consist 10 may be equipped with a communication system 44 that facilitates coordinated control of locomotives 12 and/or tender car 14. Communication system 44 may include, among other things, an access point 46 for each locomotive 12 and for tender car 14. Each access point 46 may be connected to a wired network and/or to a wireless network in parallel, and used to communicate command signals and/or data between controllers 48 of each rail vehicle and various other network components (e.g., sensor, valves, pumps, heat exchangers, accumulators, regulators, actuators, engines, generators, traction motors, brakes, etc.) 50 that are used to control locomotives 12 and/or tender car 14. Access points 46 may be connected to each other via electrical couplings 20 (e.g., via the MU cable and/or the dedicated data link) and/or wireless antennas (not shown).

Each access points 46 can include or otherwise be connected to a local area network hub, an intra-consist router, a wired Ethernet bridge, an MU modem, a wireless Ethernet bridge, and other conventional computing components known in the art (e.g., a processor, input/output ports, a storage, and a memory). These components may facilitate communication between the controllers 48, the other network components 50, and access points 46. The processor of access point 46 may embody a microprocessor and/or one or more embedded controllers. The storage can include volatile or non-volatile, magnetic, semiconductor, tape, optical, removable, non-removable, or other types of computer-readable medium or computer-readable storage device. The storage can be configured to store programs and/or other information that can be used to implement one or more of the processes discussed below. The memory can include one or more storage devices configured to store information.

Each controller 48 can be configured to control operational aspects of its related rail vehicle. For example, controller 48 of lead locomotive 12*a* can be configured to control operational aspects of its corresponding engine 28, generator 30, traction motors, operator displays, and other associated components. Likewise, the controllers 48 of trail locomotives 12*b* and 12*c* can be configured to control operational aspects of their corresponding engines 28, generators 30, traction motors, operator displays, and other associated components. In some embodiments, controller 48 of lead locomotive can be further configured to control operational aspects of trail locomotives 12*b* and/or 12*c*, if desired. For example, controller 48 of lead locomotive 12*a* can send commands through its access point 46 to the access points 46 of trail locomotives 12*b* and 12*c*. Controller 48 of tender car 14 may additionally be configured to control operational aspects of the pump(s), the heat exchanger(s), the accumulator(s), the regulator(s), and other associated tender car components.

Each controller 48 can embody a single microprocessor or multiple microprocessors that include a means for controlling an operation of the associated rail vehicle based on information obtained from any number of network components 50 and/or communications received via access points 46. Numerous commercially available microprocessors can be configured to perform the functions of controller 48. Controller 48 can include a memory, a secondary storage device, a processor, and any other components for running an application. Various other circuits may be associated with controller 48 such as power supply circuitry, signal conditioning circuitry, solenoid driver circuitry, and other types of circuitry.

In some embodiments, controllers 48 can be configured to affect operation of their associated rail vehicles based on information obtained via access points 46 and/or network components 50 and one or more maps stored in memory. Each of these maps may include a collection of data in the form of tables, graphs, and/or equations.

The information obtained by a particular controller 48 via access points 46 and/or network components 50 can include performance related data associated with operations of each locomotive 12 and/or tender car 14 ("operational information"). For example, the operational information can include engine related parameters (e.g., speeds, temperatures, pressures, flow rates, etc.), generator related parameters (e.g., speeds, temperatures, voltages, currents, etc.), operator related parameters (e.g., desired speeds, desired fuel settings, locations, destinations, braking, etc.), liquid fuel related parameters (e.g., temperatures, consumption rates, fuel levels, demand, etc.), gaseous fuel related parameters (e.g., temperatures, supply rates, fuel levels, etc.), and other parameters known in the art.

The information obtained via a particular access points 46 and/or from a particular network component 50 can have a digital format or an analog format. For example, some sensory elements, such as an engine or wheel speed sensor, a brake air or fuel pressure sensor, an exhaust temperature probe, etc., that are associated with an older locomotive 12 may be analog-based, while some or all of these same devices that are associated with a newer locomotive may be digital-based. In some situations, it may also be possible for an older locomotive to have sonic digital components and/or for a newer locomotive to have some analog components. In order for the analog information to be properly received, interpreted, processed, and/or stored by access point 46, the analog information may first need to be converted to digital format. For this purpose, access point 46 may be equipped with an expansion module 52, which expands the functionality of access point 46.

In the disclosed embodiment, expansion module 52 has plug-and-play functionality. That is, expansion module 52 may be used with many different access points 46 and/or communication network components, be generally self-contained, and have a simplified connection interface that facilitates mechanical, electrical, and/or hydraulic communication with other devices. It is contemplated, however, that in some applications, expansion module 52 may be partially or completely integrated into access point 46 (e.g., hard wired and/or co housed), if desired.

Expansion module 52 may be configured to interface with the older analog components 50 and also with the newer access point 46, and to function as an analog-to-digital converter. For example, expansion module 52 may include a box-like housing having an analog input interface 54 that receives analog signals from the analog components 50, and a digital output interface 56 that directs digital signals to access point 46. Input and output interfaces 54, 56 may take any conventional form known in the art that allows them to externally (e.g., mechanically and electrically) connect with components 50 and with access point 46. The analog signals received via input interface 54 may include, among other things, voltage levels, engine speed, wheel speed, pressures, control signals (e.g., throttle notch or braking), park brake status, etc. This data may then be converted to digital signals via a defined protocol, and passed via output interface 56 to access point 46 for processing and/or recording. In one specific embodiment, expansion module 52 uses two processors, for example a first microprocessor 58 configured to read the analog signals quickly (e.g., only about every 20 milliseconds), and a second microprocessor 60 that converts and outputs those signals via the defined protocol to access point 46. It is contemplated that expansion module could alternatively include a single microprocessor that performs the functions of both of first and second microprocessors 58 and 60, if desired.

In addition to receiving analog electrical signals from components 50 and converting those electrical signals to digital signals that are then passed to access point 46, expansion module 52 may additionally be used to directly monitor consist performance and generate corresponding digital signals. In particular, expansion module 52 may be equipped with one or more digital sensors 62 mounted to or inside of the box-like housing. These sensors 62 may then be used to monitor the performance of a previously unmonitored parameter of consist 10. For example, it may be possible to mechanically and/or hydraulically connect expansion module 52 to one or more of fluid couplings 18, allowing the fluid (e.g., pressurized air, fuel, oil, etc.) transported thereby to communicate with digital sensor(s) 62. In the embodiment depicted in FIG. 2, a conduit 64 connects a pressurized brake line of coupling 18 with a brake pressure transducer 62 mounted inside of each expansion module 52. This may allow for direct monitoring of a brake status of each locomotive 12, which may not have been possible in prior arrangements or not possible with just an A/f) converter.

In one embodiment, the digital signals generated by expansion module 52 may only be recorded in response to detection of an event (e.g., a derailment, a collision, a theft, a vandalism, etc.). For example, access point 46 and/or controller 48 may function as an event recorder, and only record the digital signals when monitored performance parameters deviate from expected ranges. In another embodiment, the analog signals may only be converted by expansion module 52 based on an event-triggering condition.

INDUSTRIAL APPLICABILITY

The disclosed communication network can be applicable to any consist that includes a plurality of vehicles (e.g., rail vehicles), such as locomotives and tender cars. The disclosed communication network, together with the disclosed expansion module, may provide for enhanced functionality of locomotives having some or only analog components. In addition, the disclosed communication network and expansion module may allow for monitoring and/or recording of performance data that was previously not possible. This enhanced functionality may provide for finer control over consist operation.

The disclosed communication network may prolong the useful life of otherwise dated locomotives. In particular, the disclosed communication network may allow the analog components of the dated locomotives to connect and communication with newer digital components. This connection may help to improve control over the locomotives, which may result in enhanced functionality and improved efficiency.

It will be apparent to those skilled in the art that various modifications and variations can be made to the disclosed communication network and expansion module without departing from the scope of the disclosure. Other embodiments of the communication network will be apparent to those skilled in the art from consideration of the specification and practice of the communication network and expansion module disclosed herein. It is intended that the specification and examples be considered as exemplary only, with a true scope being indicated by the following claims and their equivalents.

What is claimed is:

1. An expansion module for a communication network, comprising:
    a housing;
    an input interface connected to the housing and configured to externally connect with at least one analog device;
    an output interface connected to the housing and configured to externally connect with the communication network, the communication network is associated with a train consist having multiple cars connected to each other by a fluid coupling;
    at least one processor located in the housing and configured to receive analog signals from the input interface, to convert the analog signals to digital signals, and to direct the digital signals to the output interface;
    at least one sensor located in the housing and configured to generate digital signals indicative of a performance parameter associated with a fluid in communication with the housing, the performance parameter is associated with pressure; and
    a conduit connecting the fluid coupling to the housing wherein the at least one sensor is in fluid communication with the conduit.

2. The expansion module of claim 1, wherein the fluid is pressurized air used for braking.

3. The expansion module of claim 1, wherein the at least one processor is configured to read the analog signals at a rate of once every 20 milliseconds.

4. The expansion module of claim 1, wherein the at least one processor includes:
    a first microprocessor configured to read the analog signals; and
    a second microprocessor configured to convert the analog signals to digital signals.

5. The expansion module of claim 4, wherein:
    the communication network includes an event recorder; and
    the second microprocessor is configured to direct the digital signals to the event recorder via the output interface.

6. The expansion module of claim 5, wherein the second microprocessor is configured to output the digital signals to the event recorder only in response to an event-triggering condition.

7. The expansion module of claim 5, wherein the second microprocessor is configured to convert the analog signals to digital only in response to an event-triggering condition.

8. A communication network for a consist having a first vehicle connected to a second vehicle by a fluid coupling, the communication network comprising:
    a first network component;
    an analog device configured to generate analog signals indicative of a performance parameter of the first network component, wherein the performance parameter is a pressure;
    a second network component;
    an expansion module having:
        a housing;
        an input interface connected to the housing and externally connected with the analog device;
        an output interface connected to the housing and externally connected with the second network component;
        at least one processor located in the housing and configured to receive the analog signals from the input interface, to convert the analog signals to digital signals, and to direct the digital signals to the output interface; and
        at least one sensor located in the housing and configured to generate digital signals indicative of a performance parameter associated with a fluid in the fluid coupling, wherein the fluid is pressurized air used for braking; and
    a conduit connecting the fluid coupling to the housing of the expansion module, wherein the at least one sensor is in fluid communication with the conduit.

9. The communication network of claim 8, wherein the at least one processor is configured to read the analog signals at a rate of once every 20 milliseconds.

10. The communication network of claim 8, wherein the at least one processor includes:
- a first microprocessor configured to read the analog signals; and
- a second microprocessor configured to convert the analog signals to digital signals.

11. The communication network of claim 10, wherein:
the second network component is an event recorder; and
the second microprocessor is configured to output the digital signals to the event recorder.

12. The communication network of claim 11, wherein the second microprocessor is configured to output the digital signals to the event recorder only in response to an event-triggering condition.

13. The communication network of claim 12, wherein the second microprocessor is configured to convert the analog signals to digital signals only in response to an event-triggering condition.

14. The communication network of claim 8, wherein:
the expansion module is a first expansion module associated with the first vehicle of the consist; and
the communication network further includes a second expansion module associated with the second vehicle of the consist.

* * * * *